(12) United States Patent
Wang et al.

(10) Patent No.: US 12,393,489 B2
(45) Date of Patent: Aug. 19, 2025

(54) METHOD, ELECTRONIC DEVICE, AND COMPUTER PROGRAM PRODUCT FOR BACKING UP DATA

(71) Applicant: Dell Products L.P., Round Rock, TX (US)

(72) Inventors: Nan Wang, Chengdu (CN); Chi Chen, Chengdu (CN); Jing Ye, Chengdu (CN)

(73) Assignee: Dell Products L.P., Round Rock, TX (US)

( * ) Notice: Subject to any disclaimer, the term of this patent is extended or adjusted under 35 U.S.C. 154(b) by 140 days.

(21) Appl. No.: 18/240,848

(22) Filed: Aug. 31, 2023

(65) Prior Publication Data

US 2025/0036531 A1    Jan. 30, 2025

(30) Foreign Application Priority Data

Jul. 28, 2023   (CN) .......................... 202310953739.3

(51) Int. Cl.
*G06F 11/14*   (2006.01)
(52) U.S. Cl.
CPC ...... *G06F 11/1461* (2013.01); *G06F 2201/84* (2013.01)
(58) Field of Classification Search
CPC .................................................. G06F 11/1461
See application file for complete search history.

(56) References Cited

U.S. PATENT DOCUMENTS

| | | | |
|---|---|---|---|
| 2013/0086000 A1* | 4/2013 | Mostachetti | G06F 11/1448 707/654 |
| 2017/0010941 A1* | 1/2017 | Shimada | G06F 11/1464 |
| 2021/0117279 A1* | 4/2021 | Liu | G06F 11/1464 |
| 2021/0117283 A1* | 4/2021 | Wang | G06F 11/1466 |

OTHER PUBLICATIONS

Wikipedia, "Backup," https://en.wikipedia.org/wiki/Backup, Aug. 25, 2023, 16 pages.
Wikipedia, "Reinforcement Learning," https://en.wikipedia.org/wiki/Reinforcement_learning, Aug. 25, 2023, 16 pages.

* cited by examiner

*Primary Examiner* — Van H Oberly
(74) *Attorney, Agent, or Firm* — Ryan, Mason & Lewis, LLP

(57) ABSTRACT

Embodiments of the present disclosure provide a method, an electronic device, and a computer program product for backing up data. The method may include acquiring a system state of a storage system according to a data backup task. The method further includes generating, by a reinforcement learning model, a plurality of candidate backup policies based on the system state. The method further includes determining a plurality of reward values for the plurality of candidate backup policies based on amounts of resources occupied by an IO task in a plurality of time periods corresponding to the data backup task. The method further includes selecting a target backup policy based on the plurality of reward values. The method further includes performing the data backup task using the target backup policy.

20 Claims, 6 Drawing Sheets

| Candidate Backup Policy 1 | 13:00 | 14:00 | 15:00 | 16:00 | 17:00 | 18:00 | 19:00 | 20:00 |
|---|---|---|---|---|---|---|---|---|
| Data Backup Task | Bandwidth = 100% | | | | | | | |
| Service Task 1 | | Bandwidth = 100% | | | | | | |
| Service Task 2 | | | | | Bandwidth = 25% | | | |
| Service Task 3 | | | | | | | Bandwidth = 50% | |

| Candidate Backup Policy 2 | 13:00 | 14:00 | 15:00 | 16:00 | 17:00 | 18:00 | 19:00 | 20:00 |
|---|---|---|---|---|---|---|---|---|
| Data Backup Task | Bandwidth = 100% | | | | | | | |
| Service Task 1 | | Bandwidth = 100% | | | | | | |
| Service Task 2 | | | | Bandwidth = 100% | | | | |
| Service Task 3 | | | | | Bandwidth = 25% | | Bandwidth = 50% | |

| Candidate Backup Policy 3 | 13:00 | 14:00 | 15:00 | 16:00 | 17:00 | 18:00 | 19:00 | 20:00 |
|---|---|---|---|---|---|---|---|---|
| Data Backup Task | Bandwidth = 100% | | | | | | | |
| Service Task 1 | | Bandwidth = 100% | | | | | | |
| Service Task 2 | | | | Bandwidth = 25% | | | | |
| Service Task 3 | | | | | Bandwidth = 75% | | Bandwidth = 50% | |

| Candidate Backup Policy 4 | 13:00 | 14:00 | 15:00 | 16:00 | 17:00 | 18:00 | 19:00 | 20:00 |
|---|---|---|---|---|---|---|---|---|
| Data Backup Task | Bandwidth = 100% | | | | | | | |
| Service Task 1 | | Bandwidth = 100% | | | | | | |
| Service Task 2 | | | | Bandwidth = 75% | | | Bandwidth = 50% | |
| Service Task 3 | | | | | Bandwidth = 25% | | Bandwidth = 50% | |

FIG. 3

METHOD, ELECTRONIC DEVICE, AND COMPUTER PROGRAM PRODUCT FOR BACKING UP DATA

RELATED APPLICATION

The present application claims priority to Chinese Patent Application No. 202310953739.3, filed Jul. 28, 2023, and entitled "Method, Electronic Device, and Computer Program Product for Backing Up Data," which is incorporated by reference herein in its entirety.

FIELD

Embodiments of the present disclosure relate to the technical field of computers, and more particularly, to a method, an electronic device, a computer-readable storage medium, and a computer program product for backing up data.

BACKGROUND

Data backup is a technique for preventing data loss due to operational errors or storage system failures, and it can be used, for example, to protect data in the event of disaster recovery. In the daily work of a storage system, data backup is a commonly used function, so how to realize data backup by a good method is an important research field at present.

Disaster recovery is an important function of a storage system. To avoid accidental loss of data, users usually create a backup replica of important data (e.g., volumes, files, etc.) in a backup server in a data backup system, and this function can be called replication. Like snapshotting, the replication function also requires administrators to arrange replication of different objects according to different needs, so as to achieve different data recovery time objectives and data recovery point objectives.

SUMMARY

According to example embodiments of the present disclosure, a technical solution for backup is provided, which can determine, by a reinforcement learning model and based on reward values, a target backup policy for performing a data backup task. On the one hand, it can ensure that there will be no resource conflict between the data backup task and an input/output (IO) task, in order to complete the data backup task while ensuring that the IO task is not affected, and on the other hand, it can obtain a more accurate target backup policy at a low cost.

In a first aspect of the present disclosure, a method for backup is provided. The method may include acquiring a system state of a storage system according to a data backup task for backing up data from a first storage device to a second storage device. The system state may include a state of a client, a state of the first storage device, and a state of the second storage device. The method may further include generating, by a reinforcement learning model, a plurality of candidate backup policies for the data backup task based on the system state. The method further includes determining a plurality of reward values for the plurality of candidate backup policies based on amounts of resources occupied by an IO task in a plurality of time periods corresponding to the data backup task. The method further includes selecting a target backup policy from the plurality of candidate backup policies based on the plurality of reward values. The method further includes performing the data backup task using the target backup policy.

In a second aspect of the present disclosure, an electronic device is provided. The electronic device includes: a processor, and a memory coupled to the processor, the memory having instructions stored therein, wherein the instructions, when executed by the processor, cause the electronic device to perform operations that may include acquiring a system state of a storage system according to a data backup task for backing up data from a first storage device to a second storage device. The system state may include a state of a client, a state of the first storage device, and a state of the second storage device. The operations may further include generating, by a reinforcement learning model, a plurality of candidate backup policies for the data backup task based on the system state. The operations further include determining a plurality of reward values for the plurality of candidate backup policies based on amounts of resources occupied by an IO task in a plurality of time periods corresponding to the data backup task. The operations further include selecting a target backup policy from the plurality of candidate backup policies based on the plurality of reward values. The method further includes performing the data backup task using the target backup policy.

In a third aspect of the present disclosure, a computer program product is provided. The computer program product is tangibly stored on a non-transitory computer-readable storage medium and comprises machine-executable instructions, wherein the machine-executable instructions, when executed by a machine, cause the machine to perform the method according to the first aspect of the present disclosure.

As can be seen from the above description, the solution according to embodiments of the present disclosure can determine, by a reinforcement learning model and based on reward values, a target backup policy for performing a data backup task. On the one hand, it can ensure that there will be no resource conflict between the data backup task and an IO task, in order to complete the data backup task while ensuring that the IO task is not affected, and on the other hand, it can obtain a more accurate target backup policy at a low cost.

It should be understood that this Summary is provided to introduce the selection of concepts in a simplified form, which will be further described in the Detailed Description below. The Summary is neither intended to recognize key features or main features of the present disclosure, nor intended to limit the scope of the present disclosure.

BRIEF DESCRIPTION OF THE DRAWINGS

The above and other features, advantages, and aspects of embodiments of the present disclosure will become more apparent in conjunction with the accompanying drawings and with reference to the following Detailed Description. In the accompanying drawings, identical or similar reference numerals represent identical or similar elements, in which:

FIG. 3 illustrates a schematic diagram of candidate backup policies according to some embodiments of the present disclosure;

DETAILED DESCRIPTION

Figure 1:
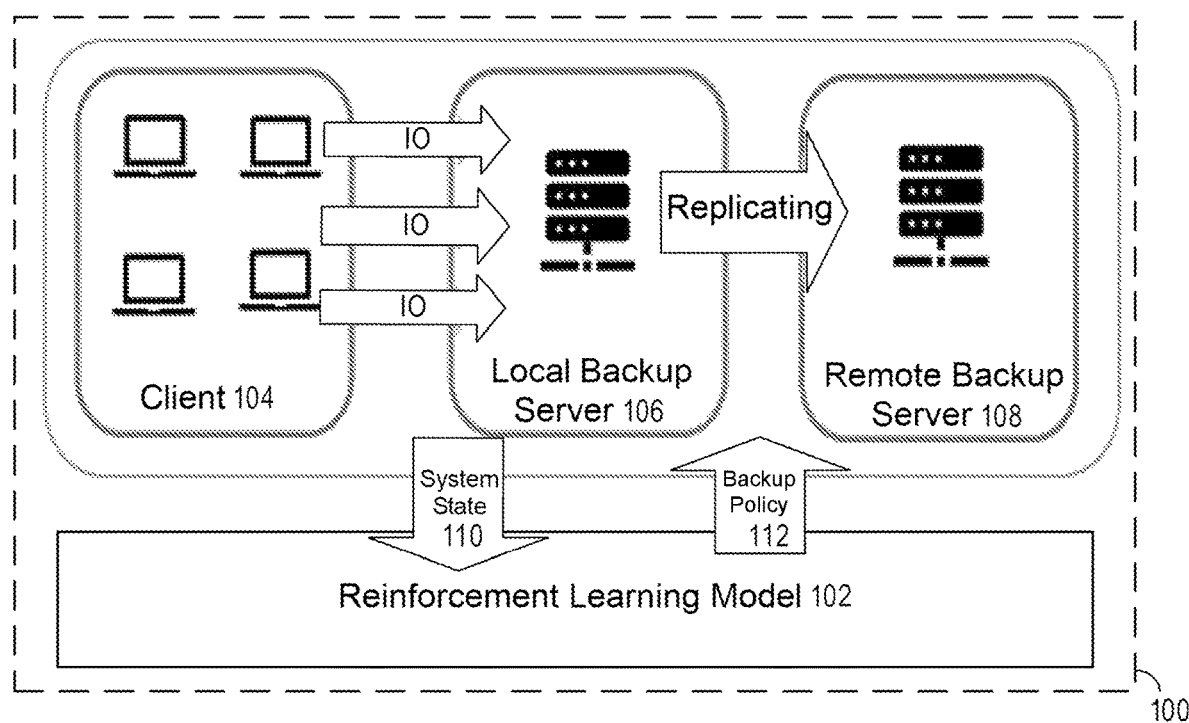
FIG. 1 illustrates an architectural diagram of a data backup system according to some embodiments of the present disclosure.

The following will describe illustrative embodiments of the present disclosure in more detail with reference to the accompanying drawings. Although the accompanying drawings show some embodiments of the present disclosure, it should be understood that the present disclosure may be implemented in various forms, and should not be construed as being limited to the embodiments disclosed herein. Rather, these embodiments are provided for understanding the present disclosure more thoroughly and completely. It should be understood that the accompanying drawings and embodiments of the present disclosure are for exemplary purposes only, and are not intended to limit the protection scope of the present disclosure.

In the description of embodiments of the present disclosure, the term "include" and similar terms thereof should be understood as open-ended inclusion, that is, "including but not limited to." The term "based on" should be understood as "based at least in part on." The term "an embodiment" or "the embodiment" should be understood as "at least one embodiment." The terms "first," "second," and the like may refer to different or identical objects. Other explicit and implicit definitions may also be included below.

In a data backup system, data can be backed up through the replication function in order to ensure that the data will not be lost due to accidents. For example, in some embodiments, the data backup system may include both a local backup server and a remote backup server, and the data backup system may replicate data from the local backup server to the remote backup server to back up a remote backup replica of the data. However, the service task between the client and the local backup server is being performed at the same time with the replication task, so there is a possibility of conflicts of resources (e.g., hardware resources and network bandwidth of the data backup system) between the replication task and the service task. Moreover, an administrator of the data backup system may not have a complete understanding of the actual situation of the data backup system. Therefore, if the scheduling of the replication task is not reasonable, the arrangement of the replication task may lead to significant performance degradation and even errors of the service task.

Accordingly, in order to ensure the completion of the replication task without affecting the service task, it is necessary to arrange the replication task reasonably. It is to be noted that a data backup system including both a local backup server and a remote backup server is illustrated below as an example for ease of understanding. However, it is to be understood that the local backup server can be replaced by a server for other purposes, and that the remote backup server can also be replaced by a backup server of another type (e.g., a local backup server).

The present disclosure provides a method, an electronic device, and a computer program product for backing up data. The method for backing up data includes acquiring a system state of a storage system according to a data backup task for backing up data from a first storage device to a second storage device. The system state may include a state of a client, a state of the first storage device, and a state of the second storage device. The method may further include generating, by a reinforcement learning model, a plurality of candidate backup policies for the data backup task based on the system state. The method further includes determining a plurality of reward values for the plurality of candidate backup policies based on amounts of resources occupied by an IO task in a plurality of time periods corresponding to the data backup task. The method further includes selecting a target backup policy from the plurality of candidate backup policies based on the plurality of reward values. The method further includes performing the data backup task using the target backup policy. The solution according to embodiments of the present disclosure can determine, by a reinforcement learning model and based on reward values, a target backup policy for performing a data backup task. On the one hand, it can ensure that there will be no resource conflict between the data backup task and an IO task, in order to complete the data backup task while ensuring that the IO task is not affected, and on the other hand, it can obtain a more accurate target backup policy at a low cost.

A method of the present disclosure is described below with reference to FIG. 1. FIG. 1 illustrates an example framework for a data backup system (also referred to as a storage system) 100. The data backup system includes a reinforcement learning model 102, a client 104, a local backup server (also referred to as a first storage device) 106, and a remote backup server (also referred to as a second storage device) 108. The client 104 can communicate with the local backup server 106 for IO, thereby executing service tasks (also referred to as IO tasks). For example, a service task may refer to a task that causes the client 104 to back up data in the local backup server 106. The remote backup server 108 can communicate with the local backup server 106 to replicate data from the local backup server 106 to the remote backup server 108, thereby implementing the data backup task. The reinforcement learning model 102 is used to optimize the data backup task to ensure the completion of the data backup task while ensuring that the service task is not affected. When the reinforcement learning model 102 is separated from the local backup server 106, the reinforcement learning model 102 can be hosted by other computing devices in the data backup system. It should be noted that although the reinforcement learning model 102 is separated from the local backup server 106 in FIG. 1, in some embodiments, the reinforcement learning model 102 can also be integrated inside the local backup server 106.

Figure 2:
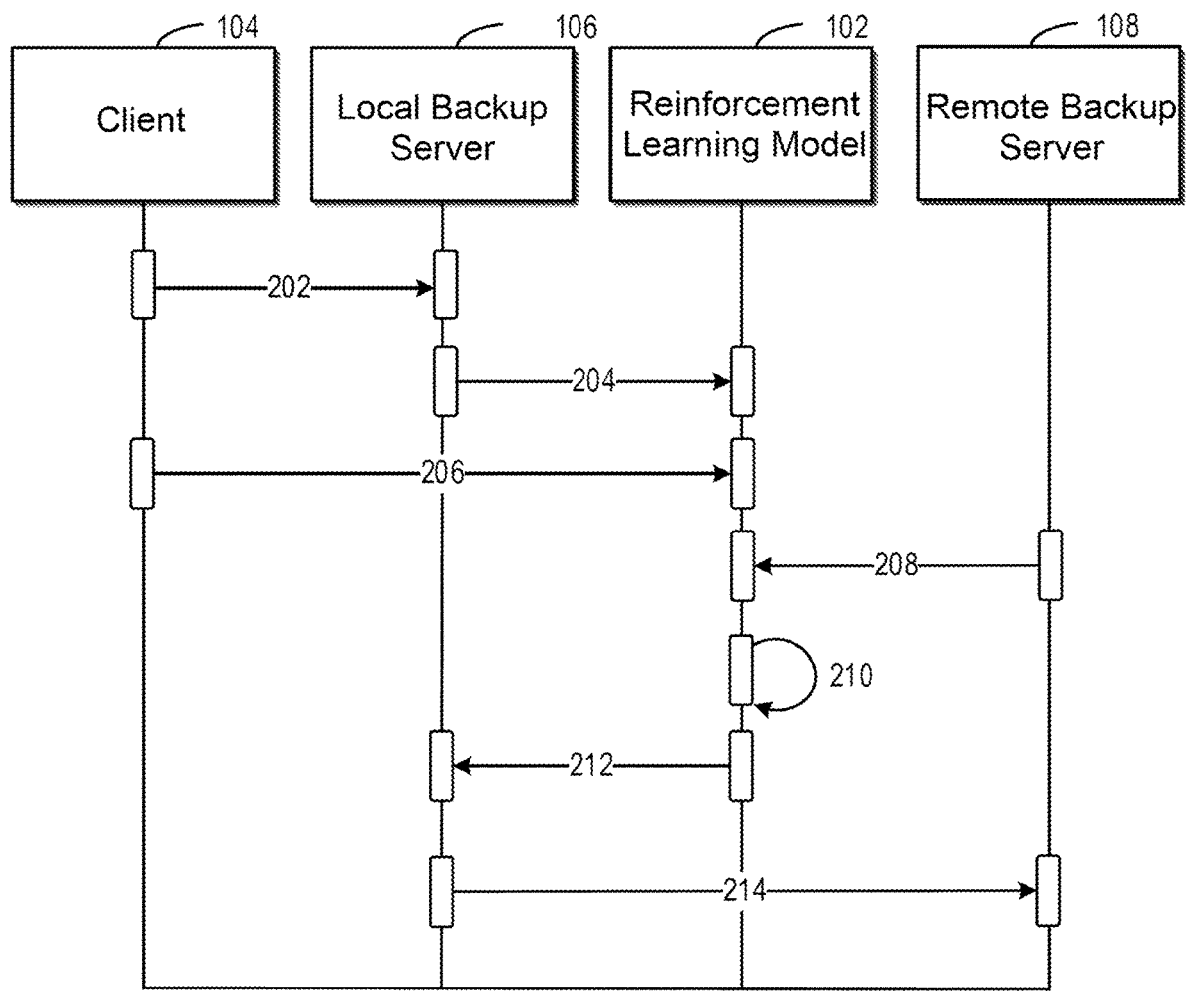
FIG. 2 illustrates a work sequence diagram of a data backup system according to some embodiments of the present disclosure.

The workflow of the data backup system is described below based on the sequence diagram of FIG. 2. At a specific time point, the reinforcement learning model 102 can be triggered. By way of example, the reinforcement learning model 102 may be triggered upon the occurrence of one or more data backup tasks in the local backup server 106, the data backup tasks being used to back up data from the first storage device to the second storage device. For example, when the local backup server 106 receives an instruction to initiate a data backup task that is input 202 by the client 104, the reinforcement learning model 102 may be triggered. For another example, when the local backup server 106 is configured to automatically generate a data backup task at a preset time point, the reinforcement learning model 102 may be triggered at that preset time point. The triggered reinforcement learning model 102 can acquire the system operation state (also referred to as the system state) of the data backup system. For example, the triggered reinforcement learning model 102 acquires 204, 206, and 208 respective states of the client 104, the local backup server 106, and the remote backup server 108, and normalizes them as the obtained system operation state. The order of 204, 206, and 208 in FIG. 2 should not be construed as a limitation on the acquisition of the system operation state. For example, 204, 206, and 208 can be performed in an order different from that of FIG. 2. It is noted that the device state may include historical situation information about the performance of tasks by the device, and may also include resource information for the device. Additionally or alternatively, the triggered reinforcement learning model 102 can acquire the network state of the data backup system for use as the system operation state. The system operation state can characterize the operation situation of the data backup system, wherein this operation situation will affect the execution result of the data backup task.

For the convenience of understanding, Table 1 below illustrates various states that the system operation state may include.

TABLE 1

Table of system operation states

| Source | Condition | Scope (unit) |
|---|---|---|
| Client 104 | Object number of service task | [0, + ∞) |
| | Amount of data of service task | [0, + ∞) (GB) |
| | Historical execution time length of service task | [0, + ∞) (min) |
| | Historical execution result of service task | 0 or 1(0 indicates an execution failure, and 1 indicates an execution success) |
| Local backup server 106 | Processor utilization rate | [0, 100%] |
| | Memory utilization rate | [0, 100%] |
| | IO utilization rate | [0, 100%] |
| | Historical execution time length of data backup task | [0, 100%] |
| | Historical execution success rate of data backup task | [0, + ∞) (min) |
| | Object number of data backup task | [0, + ∞) |
| | Amount of data of data backup task | [0, + ∞) (GB) |
| | Historical redundancy deletion rate of data backup task | [0, 100%] |
| | Historical execution result of data backup task | 0 or 1 |
| Remote backup server 108 | Processor utilization rate | [0, 100%] |
| | Memory utilization rate | [0, 100%] |
| | IO utilization rate | [0, 100%] |
| Network | Available network bandwidth | [0, + ∞) (Mbps) |
| | Network round-trip time | [0, + ∞) (ms) |

First, the historical execution time length in Table 1 will be described. The historical execution time length can be the length of time it took the data backup system to execute and complete a corresponding task (either a service task or a data backup task) in the past for a specific time period. In some embodiments, the specific time period may be associated with the current time, which means that the data backup system determines the specific time period based on the current time. For example, the specific time period may refer to several hours prior to the current time, and so on.

It should be noted that all history-related states in Table 1 can be understood as statistically obtained states in the specific time period described above. For example, the historical execution success rate of the data backup task may refer to the success rate over the specific time period, and the historical execution result of the data backup task may refer to the result (success or failure) of the data backup task when it was last executed over the specific time period. These historical data can provide statistical results for the reinforcement learning model 102 to help divide data backup tasks. In contrast, the amount of data and the object number may refer to the amount of data and the object number of the current task, which are used to indicate the situation of the current task, so as to help divide data backup tasks from another perspective. In addition to this, the reinforcement learning model 102 can also acquire the device resource situation of the device itself and the network situation, so as to help divide data backup tasks from the perspective of resources.

In addition to the system state, the reinforcement learning model 102 also acquires the amount of resources occupied by the current service task (hereinafter referred to as the service task), so that no resource conflict arises between the data backup task and the service task. By way of example, the reinforcement learning model 102 can acquire the bandwidth occupied by the service task as the amount of resources. For example, the reinforcement learning model 102 can determine, through a method of querying a task table or of prediction based on historical situations, the service task as well as the bandwidth occupied by the service task.

The reinforcement learning model 102 can then generate 210 a candidate backup policy based on the obtained system state. In some embodiments, the candidate backup policy may include a plurality of sub-tasks to be performed in different time periods and the amount of resources (e.g., bandwidth) that each sub-task occupies. By dividing the data backup task into sub-tasks that are executed in different time periods, the local backup server 106 can avoid resource conflicts between the data backup task and the service task.

Referring now to FIG. 3, this figure illustrates four cases of the candidate backup policy when the amount of resources is bandwidth in a practical application or training of the reinforcement learning model 102. For candidate backup policy 1, instead of dividing for additional sub-tasks, the data backup is performed continuously between 13:00 and 16:00 with a 100% bandwidth occupancy, and as can be seen from the bandwidth occupancy of the service task, if the candidate backup policy 1 is adopted, a significant bandwidth conflict occurs between the data backup task and the service task 1 between 14:00 and 15:00, which may result in the failure of the data backup service and/or the service task 1. In contrast, for candidate backup policy 2 to candidate backup policy 4, the problem does not arise. Similarly, for the candidate backup policy 1 and the candidate backup policy 2, there is a significant bandwidth conflict between the data backup task and the service task 2, and the same for other service tasks. As can be seen, there is a need to reasonably determine from the plurality of candidate backup policies an ideal backup policy (also referred to as a target backup policy) that will not result in a resource conflict between the data backup task and any service task. In the following, for ease of illustration, the amount of resources will be described in terms of bandwidth, but this should not be construed as a limitation to the present disclosure.

The candidate backup policy may include the time periods in which the sub-tasks are located, the amounts of data to be replicated by the sub-tasks, and the bandwidths allocated for the sub-tasks. It is to be understood that the bandwidth allocated for a sub-task should be related to the length of the time period and the amount of data that needs to be backed up in that time period, so that all the data that needs to be backed up can be replicated to the remote backup server 108, that is, to complete the data backup task. Therefore, in some embodiments, the reinforcement learning model, when generating the candidate backup policies, can determine time periods for dividing the sub-tasks and an amount of data to be backed up by a sub-task, and then determine, based on the length of the time period and the amount of data, the bandwidth to be allocated for the sub-task. For example, the minimum bandwidth required to back up the data can be allocated to this sub-task. By generating candidate backup policies that include sub-tasks, it is possible to trigger all replication tasks for the data at one time, while ignoring the overall state of the data backup system. Moreover, the method for bandwidth allocation provided by the present disclosure is more precise and does not result in any impact on the recovery time objective and/or recovery point objective requested by a user.

In some embodiments, the reinforcement learning model 102 can generate a plurality of candidate backup policies in sequence. For example, the reinforcement learning model can first acquire the current initial system state 110 and generate the first candidate backup policy 112 and the next state corresponding to the first candidate backup policy based on that system state. At the same time, the reinforcement learning model calculates the reward value for the first candidate backup policy, and if the reward value is not higher than a preset threshold, the reinforcement learning model generates the second candidate backup policy based on the next state, until the reward value for the generated candidate backup policy is higher than the preset threshold, at which time the generated candidate backup policy is output as the ideal backup policy. Alternatively, in some embodiments, the reinforcement learning model can generate N candidate backup policies and memorize the reward value for each candidate backup policy during the generation process, and when the N candidate backup policies have been generated, the reinforcement learning model selects therefrom the one with the highest reward value as the ideal backup policy to output. That is, both of the above methods illustrate that the reinforcement learning model 102 can select the ideal backup policy with the largest reward value based on the reward values for the candidate backup policies.

Figure 4:
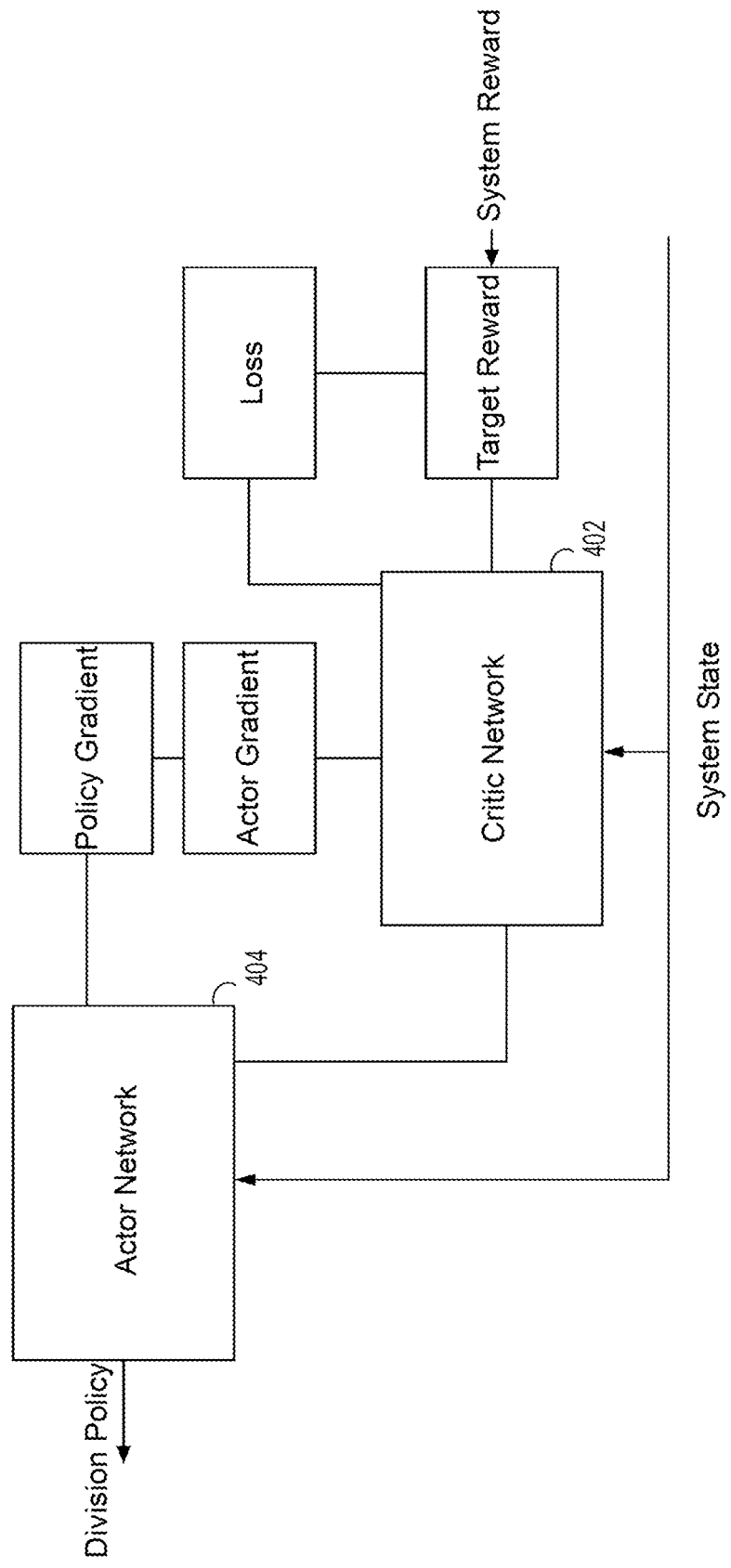
FIG. 4 illustrates a schematic diagram of a reinforcement learning model according to some embodiments of the present disclosure.

In some embodiments, the reinforcement learning model may employ the model architecture in FIG. 4. The reinforcement learning model therein includes a critic network 402 and an actor network 404. The actor network is used to output an action (i.e., generating a candidate backup policy) via a policy gradient function (policy_grad), while the critic network determines the target reward (Target_Q) for the candidate backup policy based on the candidate backup policy (and the system reward), then determines, based on the target reward, critic network parameters that minimize the loss (TD Error), and updates the critic network. After that, the reinforcement learning model updates the actor network and the policy gradient function through the output "action gradient (action_grad)" of the updated critic network, in order to update the actor network in the direction of making the reward value larger. The updated actor network can continue to generate the next candidate backup policy based on the next state until the reward value for the generated candidate backup policy is higher than the preset threshold, at which time the generated candidate backup policy is output as the ideal backup policy.

By inputting the influential real-time system states in Table 1 into the reinforcement learning model in FIG. 4, an effective ideal backup policy can be obtained based on the sensitive parameters in the reinforcement learning model, thus improving the performance of data backup. The final output of the reinforcement learning model in FIG. 4 can be a 1*I array, where I denotes the number of data backup tasks, and each element in the array is the configuration (i.e., the ideal backup policy) for each data backup task.

Taking FIG. 3 as an example, the candidate backup policy 1 to the candidate backup policy 4 may be generated by the reinforcement learning model 102 in sequence until an ideal backup policy (i.e., the candidate backup policy 4) is obtained.

In some embodiments, the reward values may be calculated based on the bandwidths occupied by the service tasks over a plurality of time periods, so that the reward values are indicative of the situation of bandwidth conflicts with the service tasks, and thus the backup policy that minimizes the bandwidth conflicts with the service tasks may be selected therefrom. For example, candidate time periods in which the service task does not occupy any bandwidth among a plurality of time periods corresponding to the data backup task may be first determined, and then a candidate backup policy that only arranges sub-tasks within those candidate time periods may be used as the ideal backup policy. Alternatively, a determination may be made as to whether a candidate backup policy has failed based on the bandwidth occupied by the service task in each time period and the bandwidth occupied by the sub-task in each candidate backup policy in the corresponding time period, and then a reward value may be determined based on the determination result. For example, it may be determined whether a time period in which the sum of the bandwidths is greater than a preset threshold exists. If it exists, it may be determined that the candidate backup policy results in a failure of the data backup task and a value of "0" is set therefor, and if it does not exist, it may be determined that the candidate backup policy will not result in a failure of the data backup task and a value of "1" is set therefor. Then, a reward value is calculated based on the set value.

In some other embodiments, since the historical execution time length included in the next system state is indicative of the time length of the execution of the service task as a result of the current candidate backup policy, the reinforcement learning model 102 may also determine the execution time length of the service task based on the next system state at the same time, and then determine the reward value for the candidate backup policy based on the execution time length and the determination result for the data backup task. Alternatively, the reinforcement learning model 102 may further determine the execution time length of the data backup task and determine the reward value for the candidate backup policy by combining the execution time length of the service task, the execution time length of the backup task, and the determination result for the data backup task.

For example, the reward value can be calculated using Equation (1):

$$R = \sum_{n=1}^{N}\left(\frac{P_n}{\log T_n} - (1 - P_n)\right) + \sum_{m=1}^{M}\left(\frac{PR_m}{\log TR_m} - (1 - PR_m)\right) \quad (1)$$

where R is the reward value, N is the number of service tasks, and $P_n$ is the execution result of the nth service task, where the value "1" represents success, the value "0" represents failure, and $P_n$ is always 1 by default because service tasks usually do not fail. $T_n$ is the execution time length of the nth service task. M is the number of data backup tasks, $PR_m$ is the execution result of the mth candidate backup task, and $TR_m$ is the execution time length of the mth candidate backup task.

After the reinforcement learning model 102 outputs 212 the ideal backup policy to the local backup server 106, the local backup server 106 can perform a plurality of sub-tasks included in the ideal backup policy to accomplish the data backup 214. For example, for the case of FIG. 3, the local backup server 106 performs data backup in the form of the candidate backup policy 4, which means that it performs data backup from 13:00 to 14:00 with 100% bandwidth, from 16:00 to 18:00 with 75% bandwidth, and from 19:00 to 20:30 with 50% bandwidth.

Figure 5:
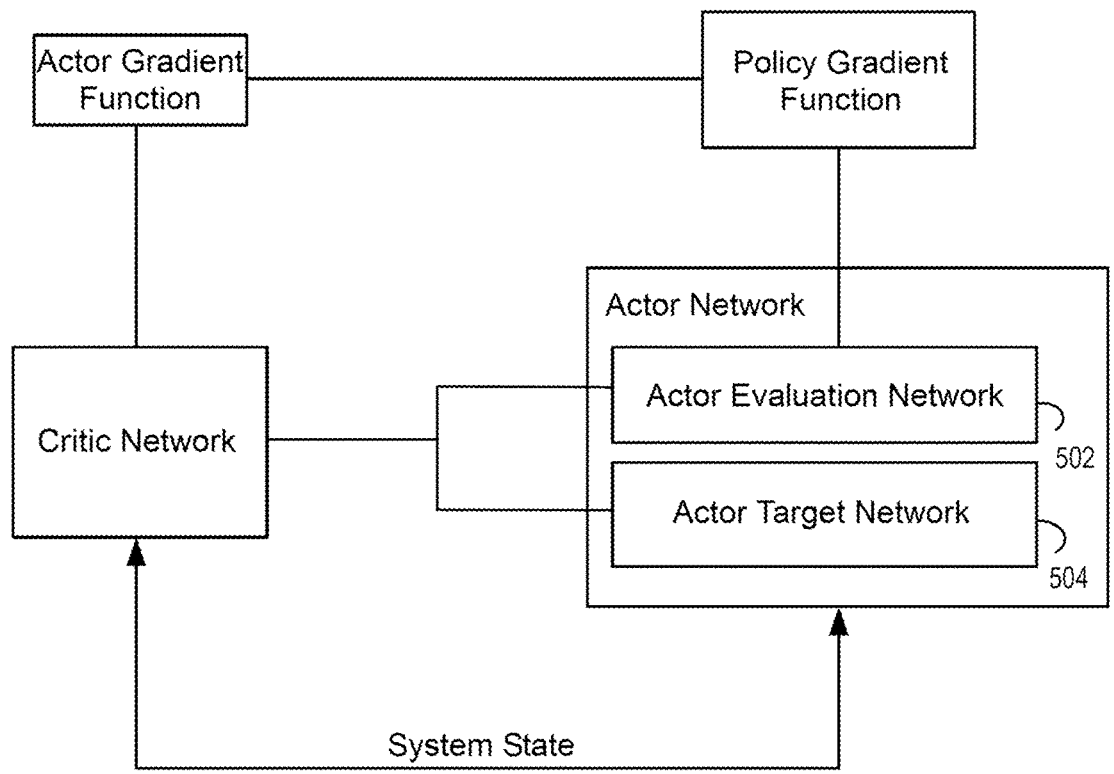
FIG. 5 illustrates another schematic diagram of a reinforcement learning model according to some embodiments of the present disclosure.
Figure 6:
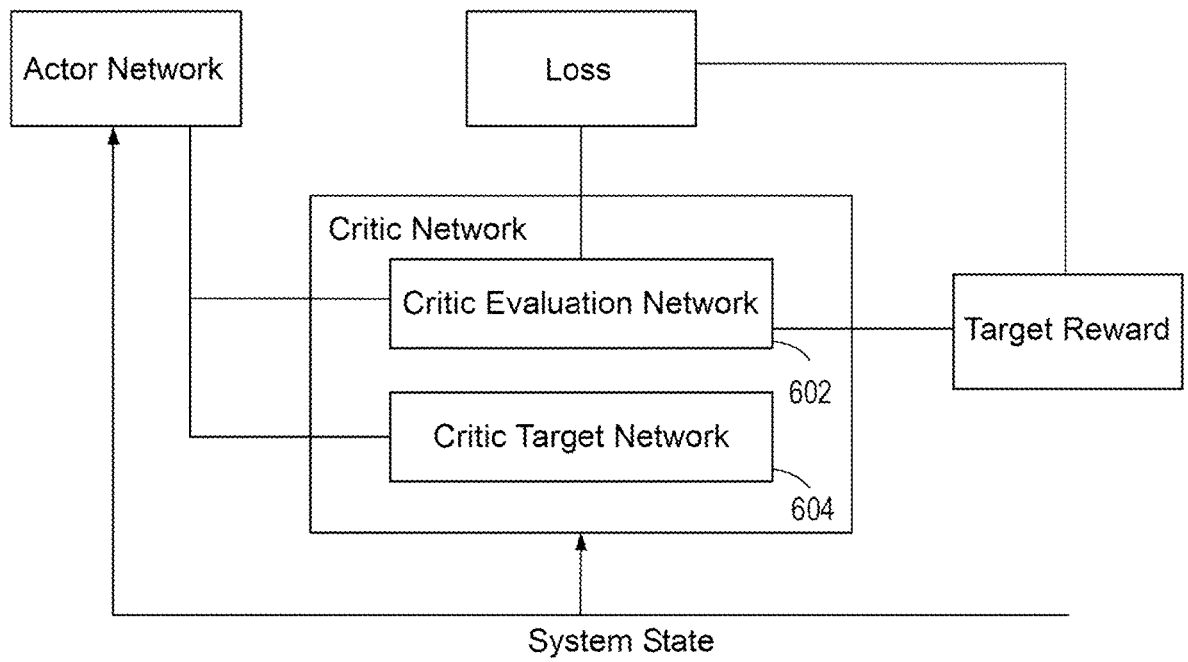
FIG. 6 illustrates another schematic diagram of a reinforcement learning model according to some embodiments of the present disclosure.

Referring to FIGS. 5 and 6, in some embodiments, the actor network and the critic network in the reinforcement learning model 102 may include an actor evaluation network 502 and an actor target network 504, and a critic evaluation network 602 and a critic target network 604, respectively. In this regard, the evaluation network updates its own parameters to the target network only when the reward value for a candidate backup policy generated later (also referred to as the second candidate backup policy) is higher than that for a candidate backup policy generated previously (also referred to as the first candidate backup policy), whereas the work of the evaluation network can be referred to the descriptions of the actor network and the critic network in FIG. 4. The actor evaluation network 502 and the policy gradient function in FIG. 5 as well as the loss, the target reward, and the critic evaluation network 602 in FIG. 6 will be updated during training. This soft update approach, on the one hand, can ensure that the parameters in the target network can always be used to obtain the current optimal candidate backup policy, and on the other hand, is more suitable for continuous control scenarios of data backup, thus avoiding affecting the performance of the model during a continuous parameter update process.

For a better illustration, the process of one round of updates of the networks by the reinforcement learning model is provided below. First, the critic evaluation network and the actor evaluation network are randomly initialized, the critic target network and the actor target network are initialized, and the experience playback pool R is initialized. Later, a random process N is initialized for action exploration, which can refer to exploration noise. The reinforcement learning model then receives an initial system state and generates a candidate backup policy based on the current policy and the exploration noise. Next, this candidate backup policy is executed, and the reward and the next system state are observed, while the initial system state, the candidate backup policy, the reward, and the next system state (this combination is called a transition) are stored in R. A batch of transitions are sampled in R, and Q reference values are calculated. The Q reference values are input into the loss, the critic evaluation network is updated by minimizing the loss, and the action policy is updated using the sampled policy gradients. Finally, the target network is updated to realize one round of updates.

To better illustrate the present disclosure, a method 700 for backing up data is also provided. First, at block 702, a system state of a storage system is acquired according to a data backup task for backing up data from a first storage device to a second storage device. The system state may include a state of a client, a state of the first storage device, and a state of the second storage device. The respective states of the client, the first storage device, and the second storage device may include those shown in Table 1. In some embodiments, the system state of the storage system may be obtained in response to determining that a data backup task exists. Taking the execution by the reinforcement learning model 102 as an example, the reinforcement learning model 102 may be triggered upon determining that a data backup task exists in the local backup server 106, so as to acquire the states of the client 104, the local backup server 106, and the remote backup server 108.

Second, at block 704, a plurality of candidate backup policies for the data backup task are generated by a reinforcement learning model based on the system state. A candidate backup policy is a policy on how to divide the data that needs to be replicated to the second storage device. For example, for 100 G data that needs to be transmitted, the candidate backup policy may include how much data to transmit over what time period and how much bandwidth to use for transmission over what time period. In some embodiments, the reinforcement learning model can generate a plurality of candidate backup policies in sequence. Taking the execution of the reinforcement learning model in FIG. 4 as an example, the reinforcement learning model in FIG. 4 may generate a candidate backup policy based on an actor network, while utilizing a critic network to update the actor network, so as to generate the next candidate backup policy based on the observed next system state.

Then, at block 706, a plurality of reward values for the plurality of candidate backup policies are determined based on amounts of resources occupied by an IO task in a plurality of time periods corresponding to the data backup task. The reward value can be used to characterize how ideal the candidate backup policy is. For example, by constructing a reasonable reward function, higher reward values can be made to characterize more ideal candidate backup policies. The reward function may take as input the completion situation of the data backup task, the execution time length of the data backup task, and/or the execution time length of the IO task, so as to calculate a reward value that can characterize how good or bad the candidate backup policy is. It is to be understood that the better the completion situation of the data backup task, the shorter the execution time length of the data backup task, and the shorter the execution time length of the IO task, then the more ideal the candidate backup policy.

Then, the process proceeds to block 708, where a target backup policy is selected from the plurality of candidate backup policies based on the plurality of reward values. Since the reward value can be used to characterize how ideal a candidate backup policy is, the ideal target backup policy can be selected based on the reward value, so as to effectively accomplish the data backup task without causing resource conflicts with the service task. By way of example, when generating several candidate backup policies is taken as the convergence condition at block 704, then the reward value for each candidate backup policy can be memorized, and then the one with the highest reward value may be selected as the target backup policy from the candidate backup policies. Alternatively, when generating a candidate backup policy with a reward value greater than a preset threshold is taken as the convergence condition at block 704, the latest generated candidate backup policy, i.e., the candidate backup policy with a reward value greater than the preset threshold, may be selected as the target backup policy.

Finally, at block 710, the data backup task is performed using the target backup policy. By using the target backup policy, the resources of the storage system can be optimized to ensure the completion of both the data backup task and the IO task. In some embodiments, the target backup policy that is output to the first storage device (e.g., the local backup server 106) may be generated by a second network in the reinforcement learning model, whereas the reinforcement learning model also includes a first network for generating a plurality of candidate backup policies at block 704. When the first network determines that a reward value for a candidate backup policy generated later is greater than a reward value for a candidate backup policy generated previously, the first network parameters corresponding to the candidate backup policy generated later are updated to those of the second network so that the second network is always capable of generating the candidate backup policy with the highest reward value. For blocks 702-710, if the administrator finds out that the actions (i.e., candidate backup policies) output by the model are consistently penalized, this can indicate that there is a serious problem with the current external network that needs to be repaired, or that the current hardware is not capable of supporting the current service task, thus more information can be provided to the system administrator.

According to the various embodiments of the present disclosure described above and their combined embodiments, it is possible to improve the efficiency of configuring functional states. It should be understood that the implementations illustrated in FIGS. 1 through 7 above are illustrative only, and depending on the actual application, the architecture or process illustrated in FIGS. 1 through 7 may take other different forms and may also include more or fewer one or more functional modules and/or units, which may be partially or fully implemented as hardware modules, software modules, firmware modules, or any combination thereof, and embodiments of the present disclosure are not limited in this regard.

It can be understood that the specific names and/or protocols of the various components of the system described herein are intended only to help those skilled in the art better understand the ideas of the present disclosure and are not intended to limit the scope of the present disclosure in any way. Further, in some other embodiments, more or better components may be included, and alternative components having the same or similar functionality may also be included.

Figure 8:
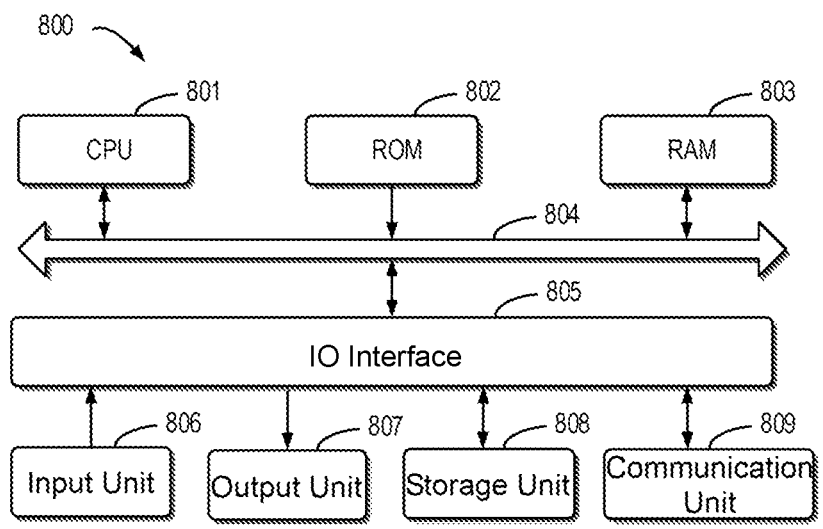
FIG. 8 illustrates a schematic structural diagram of a device that can be used to implement embodiments of the present disclosure.

FIG. 8 illustrates a schematic structural diagram of an example device 800 that can be used to implement some embodiments of the present disclosure. The device 800 may be implemented as a server or a PC. Embodiments of the present disclosure do not limit the specific implementation type of the device 800. As shown in FIG. 8, the device 800 includes a central processing unit (CPU) 801 that can perform various appropriate actions and processing according to computer program instructions stored in a read-only memory (ROM) 802 or computer program instructions loaded from a storage unit 808 to a random access memory (RAM) 803. Various programs and data required for the operation of the device 800 may also be stored in the RAM 803. The CPU 801, the ROM 802, and the RAM 803 are connected to each other through a bus 804. An IO interface 805 is also connected to the bus 804.

A plurality of components in the device 800 are connected to the IO interface 805, including: an input unit 806, such as a keyboard and a mouse; an output unit 807, such as various types of displays and speakers; a storage unit 808, such as a magnetic disk and an optical disc; and a communication unit 809, such as a network card, a modem, and a wireless communication transceiver. The communication unit 809 allows the device 800 to exchange information/data with other devices via a computer network such as the Internet and/or various telecommunication networks.

Figure 7:
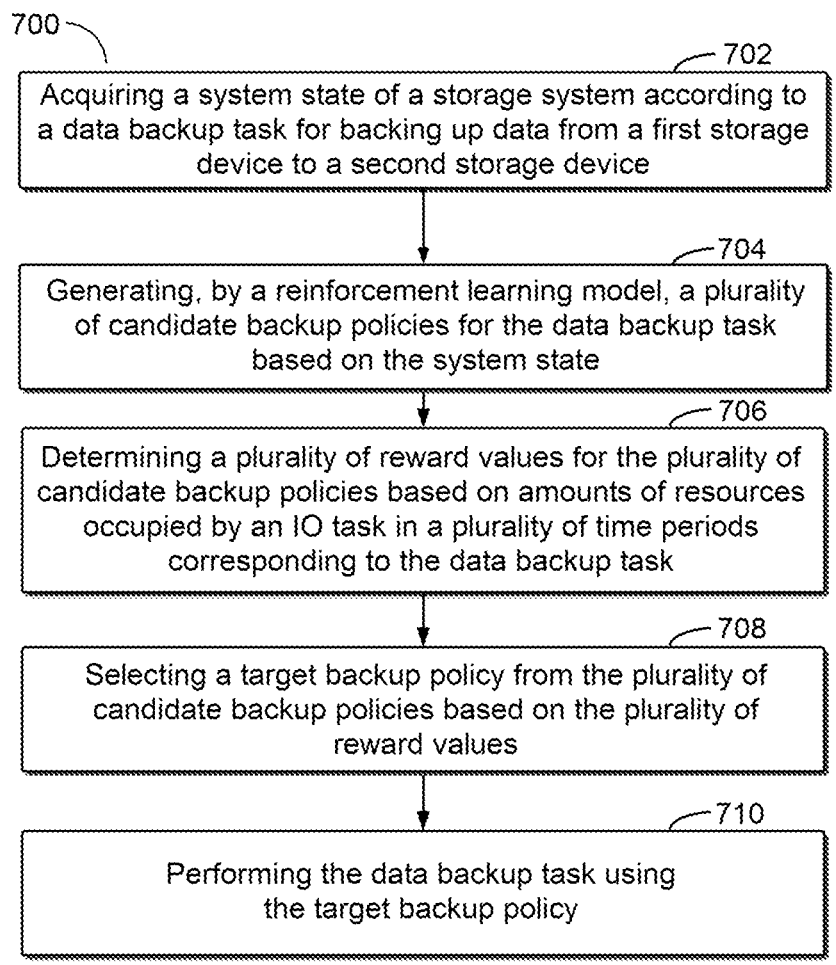
FIG. 7 illustrates a flow chart for backing up data according to some embodiments of the present disclosure.

The CPU 801 can perform the various methods and/or processing described above, for example, the method illustrated in FIG. 7. For example, in some embodiments, the method may be embodied as a computer software program that is tangibly included in a machine-readable medium, such as the storage unit 808. In some embodiments, part or all of the computer program may be loaded and/or installed onto the device 800 via the ROM 802 and/or the communication unit 809. When the computer program is loaded onto the RAM 803 and executed by the CPU 801, one or more steps of the method described above may be performed. Alternatively, in other embodiments, the CPU 801 may be configured in any other suitable manners (e.g., by means of firmware) to perform the method.

The functions described herein above may be performed at least in part by one or more hardware logic components. For example, without limitation, example types of available hardware logic components include: a Field Programmable Gate Array (FPGA), an Application Specific Integrated Circuit (ASIC), an Application Specific Standard Product (ASSP), a System on Chip (SOC), a Complex Programmable Logic Device (CPLD), and the like.

In some embodiments, the methods and processes described above may be implemented as a computer program product. The computer program product may include a computer-readable storage medium on which computer-readable program instructions for performing various aspects of the present disclosure are loaded.

Program code for implementing the method of the present disclosure may be written by using one programming language or any combination of a plurality of programming languages. The program code may be provided to a processor or controller of a general purpose computer, a special purpose computer, or another programmable data processing apparatus, such that the program code, when executed by the processor or controller, implements the functions/operations specified in the flow charts and/or block diagrams. The program code may be executed completely on a machine, executed partially on a machine, executed partially on a machine and partially on a remote machine as a stand-alone software package, or executed completely on a remote machine or server.

The computer-readable program instructions described herein may be downloaded from a computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

The computer program instructions for performing the operations of the present disclosure may be assembly instructions, Instruction Set Architecture (ISA) instructions, machine instructions, machine-related instructions, microcode, firmware instructions, state setting data, or source code or object code written in any combination of one or more programming languages, including object-oriented programming languages as well as conventional procedural programming languages. The computer-readable program instructions may be executed entirely on a user computer, partly on a user computer, as a stand-alone software package, partly on a user computer and partly on a remote computer, or entirely on a remote computer or a server.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams. The computer-readable program instructions may also be loaded to a computer, other programmable data processing apparatuses, or other devices, so that a series of operating steps may be executed on the computer, the other programmable data processing apparatuses, or the other devices to produce a computer-implemented process, such that the instructions executed on the computer, the other programmable data processing apparatuses, or the other devices may implement the functions/actions specified in one or more blocks in the flow charts and/or block diagrams.

In the information of the present disclosure, a machine-readable medium may be a tangible medium that may include or store a program for use by an instruction execution system, apparatus, or device or in connection with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination of the above content. More specific examples of the machine-readable storage medium may include one or more wire-based electrical connections, a portable computer diskette, a hard disk, a RAM, a ROM, an erasable programmable read-only memory (EPROM or flash memory), an optical fiber, a portable compact disk read-only memory (CD-ROM), an optical storage device, a magnetic storage device, or any suitable combinations thereof.

The flow charts and block diagrams in the drawings illustrate the architectures, functions, and operations of possible implementations of the devices, methods, and computer program products according to various embodiments of the present disclosure. In this regard, each block in the flow charts or block diagrams may represent a module, a program segment, or part of an instruction, and the module, program segment, or part of an instruction includes one or more executable instructions for implementing specified logical functions. In some alternative implementations, functions marked in the blocks may also occur in an order different from that marked in the accompanying drawings. For example, two successive blocks may in fact be executed substantially concurrently, and sometimes they may also be executed in a reverse order, depending on the functions involved. It should be further noted that each block in the block diagrams and/or flow charts as well as a combination of blocks in the block diagrams and/or flow charts may be implemented using a special-purpose hardware-based system that executes specified functions or actions, or using a combination of special-purpose hardware and computer instructions.

Additionally, although operations are depicted in a particular order, this should be understood that such operations are required to be performed in the particular order shown or in a sequential order, or that all illustrated operations should be performed to achieve desirable results. Under certain environments, multitasking and parallel processing may be advantageous. Likewise, although the above discussion contains several specific implementation details, these should not be construed as limitations to the scope of the present disclosure. Certain features that are described in the information of separate embodiments may also be implemented in combination in a single implementation. Conversely, various features that are described in the information of a single implementation may also be implemented in a plurality of implementations separately or in any suitable sub-combination.

Although the present subject matter has been described using a language specific to structural features and/or method logical actions, it should be understood that the subject matter defined in the appended claims is not necessarily limited to the particular features or actions described above. Rather, the specific features and actions described above are merely example forms of implementing the claims.

Various embodiments of the present disclosure have been described above. The foregoing description is illustrative rather than exhaustive, and is not limited to the various embodiments disclosed. Numerous modifications and alterations will be apparent to persons of ordinary skill in the art without departing from the scope and spirit of the illustrative embodiments. The selection of terms as used herein is intended to best explain the principles and practical applications of the various embodiments and their associated technical improvements, so as to enable persons of ordinary skill in the art to understand the various embodiments disclosed herein.

What is claimed is:

1. A method for backing up data, comprising:
   acquiring a system state of a storage system according to a data backup task for backing up data from a first storage device to a second storage device, wherein the system state comprises a state of a client, a state of the first storage device, and a state of the second storage device;
   generating, by a reinforcement learning model, a plurality of candidate backup policies for the data backup task based on the system state;
   determining a plurality of reward values for the plurality of candidate backup policies based on amounts of resources occupied by an IO task in a plurality of time periods corresponding to the data backup task;
   selecting a target backup policy from the plurality of candidate backup policies based on the plurality of reward values; and
   performing the data backup task using the target backup policy;
   wherein each candidate backup policy of the plurality of candidate backup policies comprises a plurality of sub-tasks executed in different ones of the plurality of time periods and an amount of resources occupied by each of the sub-tasks; and wherein generating the candidate backup policies comprises:

determining the plurality of time periods for dividing the sub-tasks and an amount of data to be backed up by each of the sub-tasks; and determining, based on the amount of data to be backed up by each of the sub-tasks and a length of respective ones of the time periods corresponding to each of the sub-tasks, the amount of resources occupied by each of the sub-tasks.

2. The method according to claim 1, wherein determining the plurality of reward values for the plurality of candidate backup policies comprises:

determining, based on the amount of resources occupied by the IO task in each time period of the plurality of time periods and the amount of resources occupied by a sub-task in each candidate backup policy of the plurality of candidate backup policies in the corresponding time period, whether each candidate backup policy results in a failure of the data backup task; and determining the plurality of reward values for the plurality of candidate backup policies based on the determination results.

3. The method according to claim 2, wherein determining the plurality of reward values for the plurality of candidate backup policies further comprises:

determining an IO task execution time length corresponding to each candidate backup policy based on a next system state corresponding to each candidate backup policy; and determining the plurality of reward values for the plurality of candidate backup policies based on the IO task execution time lengths and the determination results for the data backup task.

4. The method according to claim 1, wherein generating a plurality of candidate backup policies for the data backup task comprises:

generating, by a first network in the reinforcement learning model, the plurality of candidate backup policies for the data backup task based on the system state.

5. The method according to claim 4, wherein the target backup policy is a candidate backup policy with the largest reward value, and the reinforcement learning model further comprises a second network, the second network being used to synchronize parameters of the first network that are used when generating the candidate backup policy with the largest reward value, so as to output the target backup policy to the first storage device based on the system state.

6. The method according to claim 1, wherein the system state further comprises a network state related to an available network bandwidth and a round-trip time.

7. The method according to claim 6, wherein the state of the client comprises at least one of the following: an IO object number of the IO task, an amount of data of the IO task, a historical execution time of the IO task, or a historical execution result of the IO task;

the state of the first storage device comprises at least one of the following: a processor utilization rate of the first storage device, a memory utilization rate of the first storage device, an IO utilization rate of the first storage device, a historical execution time of the data backup task, a historical execution success rate of the data backup task, an object number of the data backup task, an amount of data of the data backup task, a historical redundancy deletion rate of the data backup task, or a historical execution result of the data backup task; and the state of the second storage device comprises at least one of the following: a processor utilization rate of the second storage device, a memory utilization rate of the second storage device, or an IO utilization rate of the second storage device.

8. An electronic device, comprising:

at least one processor; and memory coupled to the at least one processor, the memory having instructions stored therein, wherein the instructions, when executed by the at least one processor, cause the electronic device to perform operations comprising:

acquiring a system state of a storage system according to a data backup task for backing up data from a first storage device to a second storage device, wherein the system state comprises a state of a client, a state of the first storage device, and a state of the second storage device;

generating, by a reinforcement learning model, a plurality of candidate backup policies for the data backup task based on the system state;

determining a plurality of reward values for the plurality of candidate backup policies based on amounts of resources occupied by an IO task in a plurality of time periods corresponding to the data backup task;

selecting a target backup policy from the plurality of candidate backup policies based on the plurality of reward values; and performing the data backup task using the target backup policy;

wherein each candidate backup policy of the plurality of candidate backup policies comprises a plurality of sub-tasks executed in different ones of the plurality of time periods and an amount of resources occupied by each of the sub-tasks; and wherein generating the candidate backup policies comprises:

determining the plurality of time periods for dividing the sub-tasks and an amount of data to be backed up by each of the sub-tasks; and determining, based on the amount of data to be backed up by each of the sub-tasks and a length of respective ones of the time periods corresponding to each of the sub-tasks, the amount of resources occupied by each of the sub-tasks.

9. The electronic device according to claim 8, wherein determining the plurality of reward values for the plurality of candidate backup policies comprises:

determining, based on the amount of resources occupied by the IO task in each time period of the plurality of time periods and an amount of resources occupied by a sub-task in each candidate backup policy of the plurality of candidate backup policies in the corresponding time period, whether each candidate backup policy results in a failure of the data backup task; and determining the plurality of reward values for the plurality of candidate backup policies based on the determination results.

10. The electronic device according to claim 9, wherein determining the plurality of reward values for the plurality of candidate backup policies further comprises:

determining an IO task execution time length corresponding to each candidate backup policy based on a next system state corresponding to each candidate backup policy; and determining the plurality of reward values for the plurality of candidate backup policies based on the IO task execution time lengths and the determination results for the data backup task.

11. The electronic device according to claim 8, wherein generating a plurality of candidate backup policies for the data backup task comprises:

generating, by a first network in the reinforcement learning model, the plurality of candidate backup policies for the data backup task based on the system state.

12. The electronic device according to claim 11, wherein the target backup policy is a candidate backup policy with the largest reward value, and the reinforcement learning model further comprises a second network, the second network being used to synchronize parameters of the first network that are used when generating the candidate backup policy with the largest reward value, so as to output the target backup policy to the first storage device based on the system state.

13. The electronic device according to claim 8, wherein the system state further comprises a network state related to an available network bandwidth and a round-trip time.

14. The electronic device according to claim 13, wherein the state of the client comprises at least one of the following: an IO object number of the IO task, an amount of data of the IO task, a historical execution time of the IO task, or a historical execution result of the IO task;

the state of the first storage device comprises at least one of the following: a processor utilization rate of the first storage device, a memory utilization rate of the first storage device, an IO utilization rate of the first storage device, a historical execution time of the data backup task, a historical execution success rate of the data backup task, an object number of the data backup task, an amount of data of the data backup task, a historical redundancy deletion rate of the data backup task, or a historical execution result of the data backup task; and the state of the second storage device comprises at least one of the following: a processor utilization rate of the second storage device, a memory utilization rate of the second storage device, or an IO utilization rate of the second storage device.

15. A computer program product that is tangibly stored on a non-transitory computer-readable storage medium and comprises machine-executable instructions, wherein the machine-executable instructions, when executed by a machine, cause the machine to perform operations comprising:

acquiring a system state of a storage system according to a data backup task for backing up data from a first storage device to a second storage device, wherein the system state comprises a state of a client, a state of the first storage device, and a state of the second storage device;

generating, by a reinforcement learning model, a plurality of candidate backup policies for the data backup task based on the system state;

determining a plurality of reward values for the plurality of candidate backup policies based on amounts of resources occupied by an IO task in a plurality of time periods corresponding to the data backup task;

selecting a target backup policy from the plurality of candidate backup policies based on the plurality of reward values; and performing the data backup task using the target backup policy;

wherein each candidate backup policy of the plurality of candidate backup policies comprises a plurality of sub-tasks executed in different ones of the plurality of time periods and an amount of resources occupied by each of the sub-tasks; and wherein generating the candidate backup policies comprises:

determining the plurality of time periods for dividing the sub-tasks and an amount of data to be backed up by each of the sub-tasks; and determining, based on the amount of data to be backed up by each of the sub-tasks and a length of respective ones of the time periods corresponding to each of the sub-tasks, the amount of resources occupied by each of the sub-tasks.

16. The computer program product according to claim 15, wherein determining the plurality of reward values for the plurality of candidate backup policies comprises:

determining, based on the amount of resources occupied by the IO task in each time period of the plurality of time periods and the amount of resources occupied by a sub-task in each candidate backup policy of the plurality of candidate backup policies in the corresponding time period, whether each candidate backup policy results in a failure of the data backup task; and determining the plurality of reward values for the plurality of candidate backup policies based on the determination results.

17. The computer program product according to claim 16, wherein determining the plurality of reward values for the plurality of candidate backup policies further comprises:

determining an IO task execution time length corresponding to each candidate backup policy based on a next system state corresponding to each candidate backup policy; and determining the plurality of reward values for the plurality of candidate backup policies based on the IO task execution time lengths and the determination results for the data backup task.

18. The computer program product according to claim 15, wherein generating a plurality of candidate backup policies for the data backup task comprises:

generating, by a first network in the reinforcement learning model, the plurality of candidate backup policies for the data backup task based on the system state.

19. The computer program product according to claim 18, wherein the target backup policy is a candidate backup policy with the largest reward value, and the reinforcement learning model further comprises a second network, the second network being used to synchronize parameters of the first network that are used when generating the candidate backup policy with the largest reward value, so as to output the target backup policy to the first storage device based on the system state.

20. The computer program product according to claim 15, wherein the system state further comprises a network state related to an available network bandwidth and a round-trip time.

* * * * *